March 28, 1944.  O. A. TINKER  2,345,437
THRUST BEARING
Filed July 9, 1943
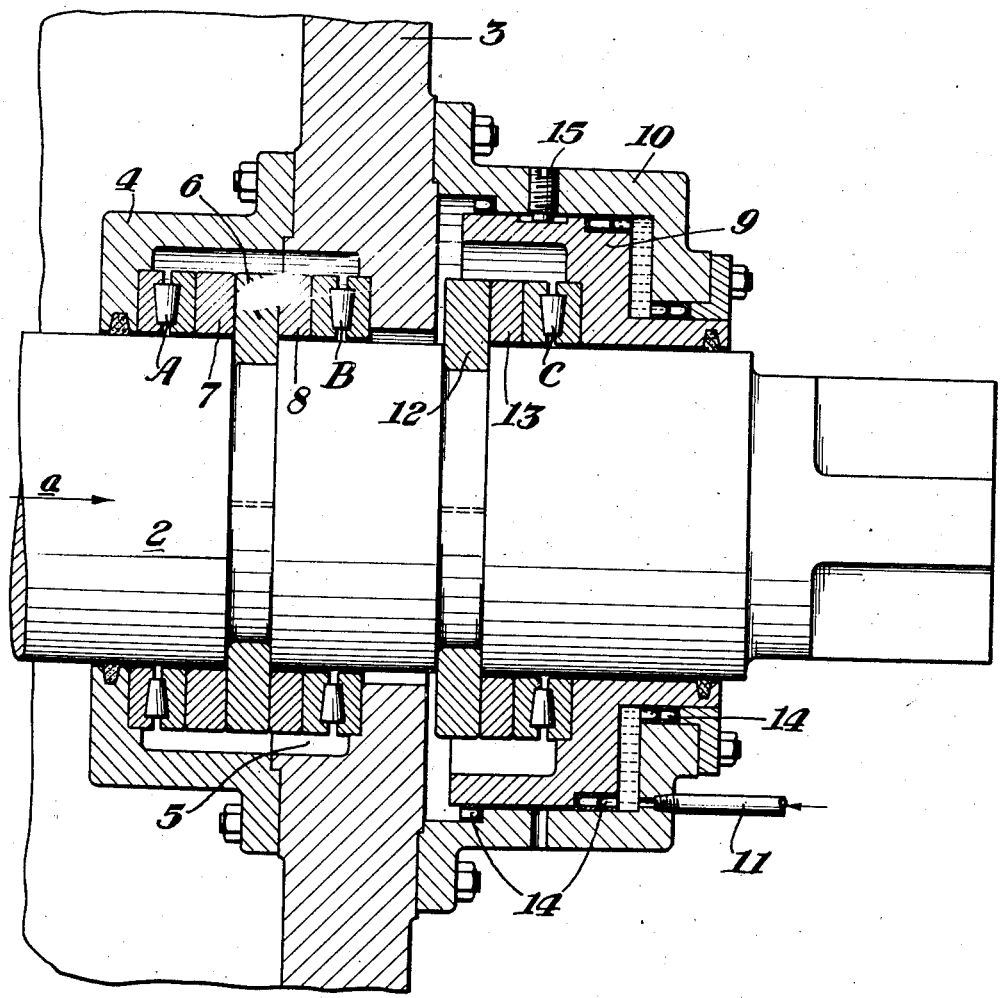
INVENTOR:
OSCAR A. TINKER,
BY John E. Jackson
HIS ATTORNEY.

Patented Mar. 28, 1944

2,345,437

UNITED STATES PATENT OFFICE 2,345,437

THRUST BEARING

Oscar A. Tinker, Mount Lebanon, Pa., assignor to National Tube Company, a corporation of New Jersey Application July 9, 1943, Serial No. 494,063

3 Claims. (Cl. 308—234)

This invention relates to improvements in thrust bearings, and more particularly to a thrust bearing employing a series of anti-friction bearings disposed to distribute the thrust and to absorb impact.

For example, in seamless tube mills, the bearings for the rolls are repeatedly subjected to severe shock or impact forces, which, when abnormal or when applied to loose bearings, cause failure of the bearings and result in costly delays. The conventional stacked or multiple thrust bearings have been employed heretofore, but are dependent upon precision spacing and fitting, which increases the cost thereof and does not avoid failure in use due to severe impact and wear.

It is the principal object of my invention to provide a thrust bearing which will absorb severe and repeated thrust forces, and which will compensate for wear to thereby prolong its life in service.

Additional objects and advantages will become apparent from the following description taken in connection with the accompanying drawing, illustrating partly in elevation and section, a thrust bearing embodying my invention.

Referring to the drawing, 2 designates a rotatable shaft, as for example, the neck of a roll of a seamless tube mill, extending through a suitable fixed support or housing 3 which generally mounts the bearing for said shaft. The shaft 2, as in the case of a seamless tube mill roll, receives repeated axial forces or thrusts in the direction indicated by the arrow $a$, due to the passage of the work through the mill. In addition to such thrust forces being intermittent, they vary in magnitude and require a bearing having the capacity to accommodate such variable forces.

I have provided a thrust bearing for such a shaft employing three anti-friction bearings A, B and C which are loaded in proper relation, as by means of fluid pressure, to distribute the thrust thereon without undue load concentrations and without liability to injury by impact.

Bearings A and B are mounted in axially spaced relation on the support 3, bearing A being mounted in a bearing housing 4 secured to said support, and bearing B being contained in a recess 5 in the support 3. The housing 4 and support 3 provide spaced fixed abutments upon the outer sides of the bearings A and B respectively. The shaft 2 is provided with a thrust abutment or collar 6 extending between said bearings. In order that anti-friction bearings of the same size may be used, and assembled, the collar 6 may be in the form of a split ring fitting a recess in the shaft 2 as shown. Annular spacer members or bearing rings 7 and 8 are disposed between the thrust collar 6 and the bearings A and B respectively.

Bearing C is spaced from bearings A and B and is carried within a fluid piston 9 reciprocable in a cylinder 10 secured to the support 3. Fluid under pressure is supplied to cylinder 10 by supply conduit 11 to urge piston 9 in a direction opposite to the direction of thrust $a$, whereby bearing C is urged against a thrust collar 12 on shaft 2 through an intervening spacer ring 13. Piston 9 is fluid-sealed at 14 with the cylinder, and is slotted to receive a screw 15 to prevent rotation with respect to said cylinder.

In operation, when no thrust is applied to the shaft 2, the piston 9 loads the bearings A and C in an amount not exceeding a safe load therefor. Such fluid loading may be readily controlled by the pressure maintained at the supply 11 and by properly proportioning the effective area of piston 9.

As will be readily seen, the load so applied when there is no thrust upon the shaft 2 is transmitted from piston 9 through bearing C, thrust collar 12, shaft 2, thrust collar 6 and bearing A, the said load being against the fixed housing 4.

When a thrust is applied to the shaft 2 in the direction of arrow $a$, the bearing A is unloaded, and the immediate force and impact of the thrust is absorbed by the piston 9 and bearing C against the cushioning fluid pressure in cylinder 10, there being a small amount of play or clearance between collar 6 and bearings A and B, permitting axial movement of the shaft 2. If the magnitude of the thrust exceeds that of the fluid loading upon piston 9, the excess of said thrust is applied to bearing B against the fixed support 3, through collar 6 from the shaft 2, thus distributing the thrust loading upon bearing C within its capacity and applying the balance to bearing B.

Hence, by selecting anti-friction bearings of the proper size and capacity and a corresponding fluid loading thereon, my improved thrust bearing will safely and economically absorb the varying loads to be encountered in service. It should be noted that, due to the fluid cushioning, the danger of injury to the anti-friction bearings from impact is obviated. Also, the fluid cushioning automatically compensates for wear in the bearing structure.

Various changes and modifications are contemplated within the scope of the following claims.

I claim:

1. A thrust bearing including a fixed pair of axially spaced anti-friction bearings, a third anti-friction bearing movable with respect to said pair of bearings, and means for normally loading the third and one of said pair of anti-friction bearings contra to the direction of thrust including a fluid-actuated piston, said piston being movable under a thrust of a magnitude exceeding that of the loading thereon to distribute said thrust between the third and the other of said pair of anti-friction bearings.

2. A thrust bearing including a fixed pair of axially spaced anti-friction bearings, a thrust collar therebetween adapted to transmit axial forces to either of said pair of bearings, a third anti-friction bearing axially spaced from and movable with respect to said pair of bearings, a thrust collar therefor connected to said first thrust collar, and a fluid-actuated piston normally loading the third and one of said pair of anti-friction bearings through said thrust collars contra to the direction of thrust, said piston being movable under a thrust of a magnitude exceeding that of the loading upon said piston to distribute said thrust between the third and the other of said pair of anti-friction bearings through said thrust collars.

3. A thrust bearing including a pair of anti-friction bearings spaced axially of the bearing proper and having fixed abutments disposed at the outer sides of said anti-friction bearings, a third anti-friction bearing, a fluid-actuated piston mounting said third bearing and normally urging the latter in an axial direction contra to the direction of thrust, a cylinder enclosing said piston, means for supplying fluid under pressure to said cylinder, and thrust transmitting means engaged by said third and extending between said pair of anti-friction bearings, said piston normally loading said third and one of said pair of anti-friction bearings through said thrust transmitting means, and being movable in a reverse direction under a thrust of a magnitude exceeding that of the loading thereon to distribute said thrust between the third and the other of said pair of anti-friction bearings through said thrust transmitting means.

OSCAR A. TINKER.